United States Patent
Blumenstock

(10) Patent No.: US 6,359,357 B1
(45) Date of Patent: Mar. 19, 2002

(54) COMBINATION RADIAL AND THRUST MAGNETIC BEARING

(75) Inventor: Kenneth A. Blumenstock, College Park, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/640,653

(22) Filed: Aug. 18, 2000

(51) Int. Cl.[7] .............................................. H02K 7/09
(52) U.S. Cl. ................................................... 310/90.5
(58) Field of Search ........................... 310/90.5, 74, 65

(56) References Cited

U.S. PATENT DOCUMENTS

| | | | |
|---|---|---|---|
| 4,043,614 A | * 8/1977 | Lyman | 310/90.5 |
| 4,483,570 A | * 11/1984 | Inoue | 310/90.5 |
| 5,216,308 A | 6/1993 | Meeks | |
| 5,406,157 A | * 4/1995 | New | 310/90.5 |
| 5,514,924 A | * 5/1996 | Mc Mullen | 310/90.5 |
| 5,767,597 A | 6/1998 | Gondhalekar | |
| 5,844,345 A | 12/1998 | Hsu | |
| 6,049,148 A | 4/2000 | Nichols et al. | |

FOREIGN PATENT DOCUMENTS

JP 02214438 A * 8/1990 ............ H02K/7/80

* cited by examiner

*Primary Examiner*—Nestor Ramirez
*Assistant Examiner*—Karen Addison

(57) ABSTRACT

A combination radial and thrust magnetic bearing is disclosed that allows for both radial and thrust axes control of an associated shaft. The combination radial and thrust magnetic bearing comprises a rotor and a stator. The rotor comprises a shaft, and first and second rotor pairs each having respective rotor elements. The stator comprises first and second stator elements and a magnet-sensor disk. In one embodiment, each stator element has a plurality of split-poles and a corresponding plurality of radial force coils and, in another embodiment, each stator element does not require thrust force coils, and radial force coils are replaced by double the plurality of coils serving as an outer member of each split-pole half.

17 Claims, 10 Drawing Sheets

COMBINATION RADIAL AND THRUST MAGNETIC BEARING

ORIGIN OF THE INVENTION

The invention described herein was made by an employee of the United States Government and may be manufactured and used by or for the Government for governmental purposes without payment of any royalties thereon or therefor.

TECHNICAL FIELD

The invention relates to magnetic bearings used in control systems and, more particularly, to a combination radial and thrust magnetic bearing that provides both radial and thrust axes control devices.

BACKGROUND OF THE INVENTION

Bearings are used to rotatably support a shaft so it is maintained in the proper alignment required during operation, as well as to reduce fictional losses, noise, and wear. Typically, the shaft is centered within the bearings enclosure so that the shaft does not come into contact with the housing or the bearing enclosure itself as the shaft rotates. Magnetic bearings and non-magnetic or conventional mechanical bearings are two types of bearings that are typically used to rotatably support a shaft.

The types of conventional non-magnetic bearing include, for example, ball bearings, roller bearings and needle bearings. These bearings, however, have a number of disadvantages such as requiring the use of a lubricant to keep the bearings working properly, to reduce frictional losses and to dissipate heat energy. As such, bearings and bearing housing are designed to keep the lubricant from escaping, as well as to maintain the bearing in the proper alignment. Maintaining the proper lubrication becomes a problem as operational stress, rotational speeds and inherent temperatures increase.

The lubrication problems do not exist with magnetic bearings because they are the non-contact type bearings that effectively levitates or floats the rotating shaft/member by developed magnetic fields. Magnetic fields are developed by permanent magnets and/or electro-magnetically, by means of a closed-loop controller to provide appropriate currents to control coils such that appropriate magnetic fields are developed to provide stable positioning of the rotating shaft/ member. Because magnetic bearings are non-contact bearings, there are no frictional losses resulting from contact, but rather there are rotational losses due to eddy-currents and hysteresis. These losses are typically much smaller than frictional losses. Also mechanical noise is typically reduced in comparison to conventional bearings because of the avoidance of mechanical erosion by magnetic bearings. Magnetic bearings used in control systems are known and some of which are described in U.S. Pat. Nos. 5,216,308 ('308); 5,514,924 ('924); 5,767,597 ('597); and 6,049,148 ('148). It is desired to further improve magnetic bearings. More particularly, it is desired that a single magnetic bearing unit of a compact design having improved performance be provided that has the capability to control a rotating shaft along the radial and thrust directions. Specifically, it is desired that a magnetic bearing be provided having independent magnetic flux paths for radial and thrust control coils such that the magnetic flux path does not flow through any bias magnets so that maximal coil efficiencies can be achieved. Moreover, it is desired to provide a magnetic bearing using laminated material for carrying magnetic fluxes used to develop both radial and thrust forces so as to minimize rotational losses. Furthermore, it is desired to provide a magnetic bearing of homopolar configuration in order to further minimize rotational losses. Moreover, it is desired to provide a magnetic bearing which has its radial x and y position sensors centrally co-located where the x and y activation force vectors act upon the shaft being levitated.

STATEMENT OF INVENTION

The invention is directed to a combination radial and thrust magnetic bearing that allow for both radial and thrust axes control of an associated shaft arranged therein.

The combination radial and thrust magnetic bearing provides magnetic fields used to control a shaft in both the radial and thrust axes. The combination radial and thrust magnetic bearing comprises a rotor and a stator. The rotor comprises a shaft, a first rotor pair having conical rotor elements separated from each other by a first spacer, and a second rotor pair having conical rotor elements separated from each other by a second spacer. The first rotor pair is separated from the second rotor pair by a sensor sleeve. A stator has first and second stator elements separated from each other by a magnet-sensor disk. The magnet-sensor disk has means to locate bias magnets and means to secure a plurality of position sensors. Each of the first and second stator elements, in one embodiment, comprises: (i) an inner flux ring; (ii) an outer flux ring; (iii) a thrust coil; (iv) a plurality of split poles with conically symmetric pole faces; and (v) a plurality of radial force coils one for each of the plurality of split poles and operatively connected thereto.

It is an object of the present invention to provide for a single homopolar magnetic bearing used for both radial and thrust axes control.

It is another object of the present invention to provide for radial and thrust force coils that can simultaneously and independently be used to provide magnetic forces in both the radial and thrust axes for control of an associated shaft.

It is a further object of the present invention to provide for position sensors and a control system that are utilized with a combination magnetic bearing for radial and thrust axes control of the associated shaft.

Further, it is an object of the present invention to provide for a magnetic bearing that can be equipped with separate thrust force coils and separate radial force coils to maintain independence of thrust and radial activation and control of the associated shaft.

It is another object of the present invention to provide for a magnetic bearing that minimizes both resistive and rotational losses by utilizing an efficient magnetic circuit design and a geometry which allows for practical use of laminated soft-magnetic material.

It is yet another object of this invention to provide for a magnetic bearing which has its radial x and y position sensors centrally co-located where the x and y actuation force vectors act upon the shaft being levitated.

BRIEF DESCRIPTION OF THE DRAWINGS

FIG. 3 is composed of FIG. 3(A) and FIG. 3(B), with FIG. 3(A) being a cross-section of the magnet-sensor disk orthogonal to the shaft axis, and FIG. 3(B) being a cross-section of the shaft along the shaft axis, wherein both

DETAILED DESCRIPTION OF THE INVENTION

Figure 1:
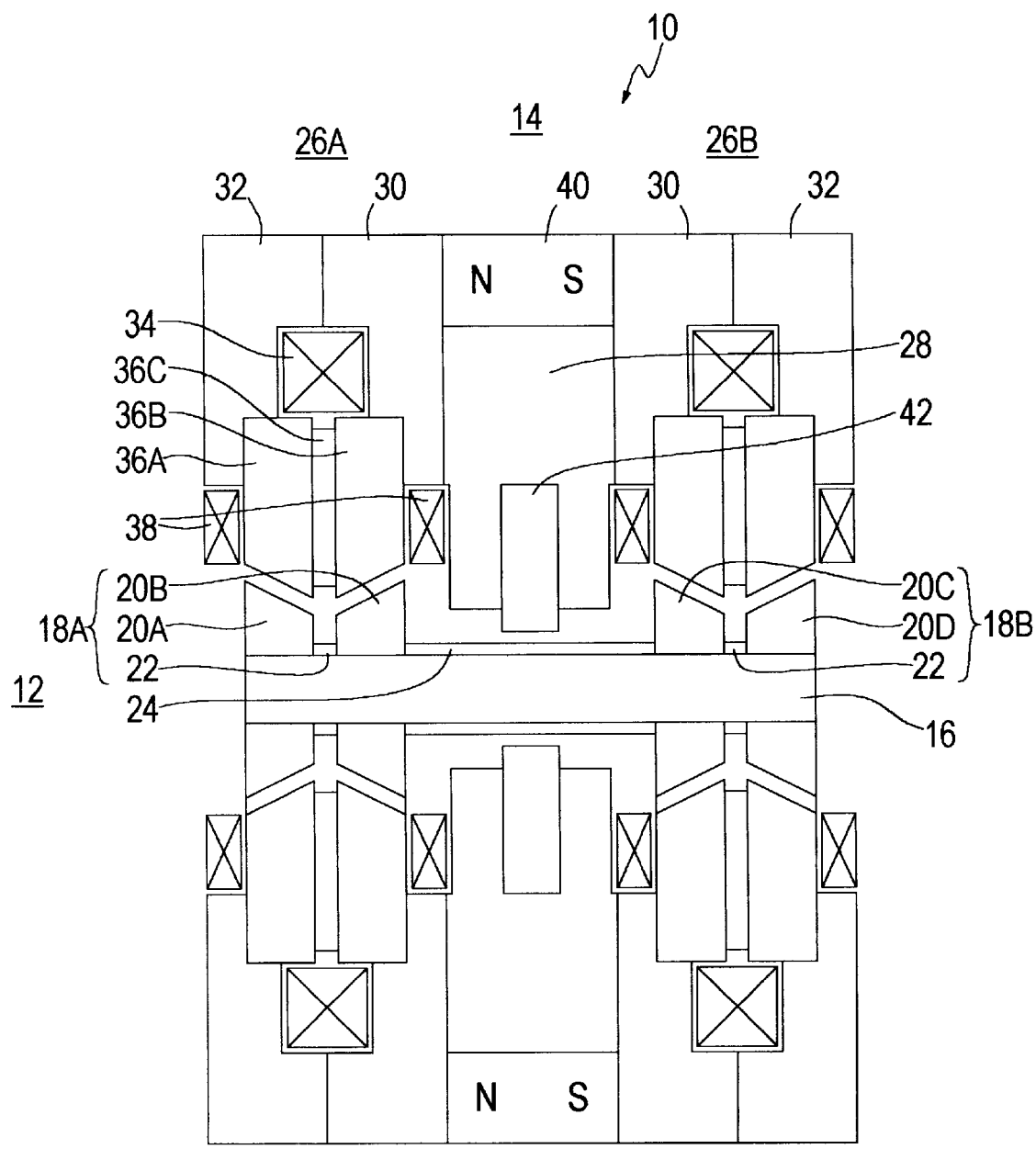
FIG. 1 is a cross-sectional view of the combination radial and thrust magnetic bearing of the present invention.

With reference to the drawings, wherein the same element is indicated by the same reference number throughout, there is shown in FIG. 1 a cross-sectional view showing the elements of the present invention. The present invention, in one embodiment, is a magnetic bearing 10 and is comprised of two (2) assemblies, the rotor 12 and the stator 14.

The magnetic bearing 10 of the present invention is of a homopolar configuration. Magnetic bearings are generally classified either homopolar or heteropolar. As will be further described hereinafter, homopolar magnetic bearings usually have two (2) stator elements, whereas heteropolar magnetic bearings have one (1) stator element. The bias magnetic flux of a homopolar magnetic bearing is essentially radially inwards of the rotor element associated with one of the stator elements, and radially outwards of the rotor element associated with the other stator element. Since the poles of a stator element see essentially the same bias magnetic flux, the term homopolar is applied. A heteropolar magnetic bearing has its bias magnetic flux change polarity from any pole to its adjacent pole, hence the term heteropolar. The main advantage of a homopolar magnetic bearing, such as the magnetic bearing 10, is that eddy-current and hysteresis losses are reduced because the rotor flux is more uniform, thus reducing rotational losses.

The rotor 12 of the magnetic bearing 10 comprises a shaft 16, a first rotor pair 18A with rotor elements 20A and 20B separated from each other by spacer 22, and a second rotor pair 18B with rotor elements 20C and 20D separated from each other by a spacer 22. The second rotor pair 18B is separated from the first rotor pair 18A by sensor sleeve 24.

A mechanism utilizing this invention will likely require two magnetic bearing units, most commonly configured with each magnetic bearing 10 at each end of a shaft. A second magnetic bearing can be of this invention or can be a radial force only magnetic bearing. The shaft 16 may be a single unit for the entire mechanism and will utilize some means of the prior art to provide clamping force to secure all the components of the rotor 12. One means to do so would be to have a stop at each shaft location that is at the inboard side of each magnetic bearing, and a threaded portion at each shaft location at the outboard sides of each magnetic bearing, and use nuts at each outboard end of the shaft to provide the necessary clamping force.

The stator 14 comprises two identical stator elements 26A and 26B separated from one another by a magnet-sensor disk 27 to be further described hereinafter with reference to FIG. 3. Each of the stator elements 26A and 26B, shown in FIG. 1, comprises an inner flux ring 30, an outer flux ring 32, a thrust coil 34, a plurality of split-poles 36, and a plurality of radial force coils 38, one radial force coil 38 for each split-pole 36. As seen in FIG. 1, each of the split-poles 36 comprises elements 36A, 36B and 36C to be described hereinafter with reference to FIG. 4. The magnet-sensor disk 27 locates a plurality of bias magnets 40 as well as securing a plurality of position sensors 42, all to be further described hereinafter with reference to FIG. 3.

Figure 2:
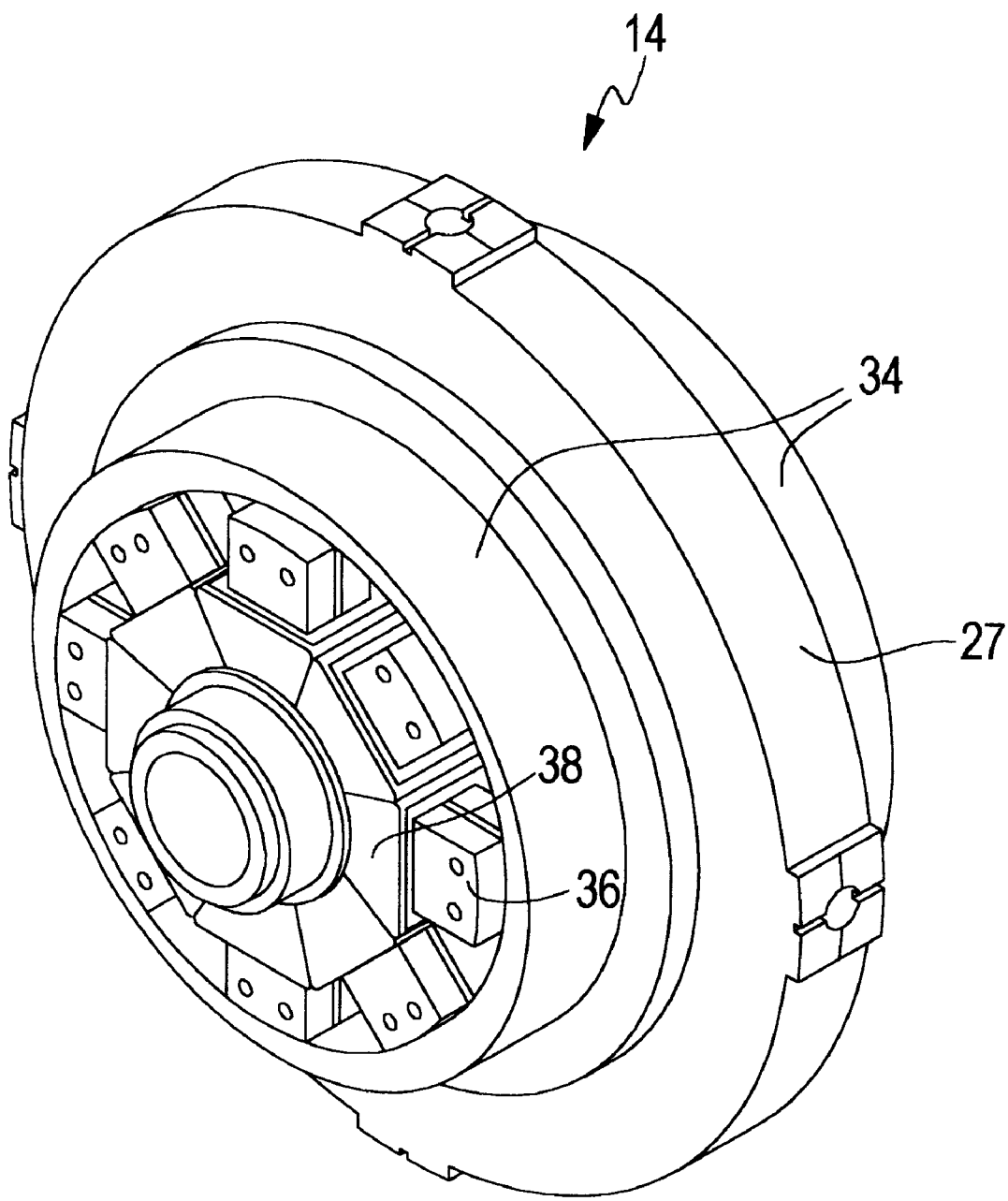
FIG. 2 illustrates further details of the radial and thrust magnetic bearing combination of the present invention.

For the embodiment of FIG. 2, the circumferentially and equally spaced split-poles 36 are comprised of eight (8) thereof, and the circumferentially and equally spaced radial force coils 38 are comprised of eight (8) thereof. There are eight (8) split-poles 36 per stator elements 26A and 26B. The magnet-sensor disk 27 comprises a disk element 28, four (4) bias magnets 40 circumferentially disposed and equally spaced therein, and two (2) position sensors, as depicted in FIG. 3.

Figure 3A:
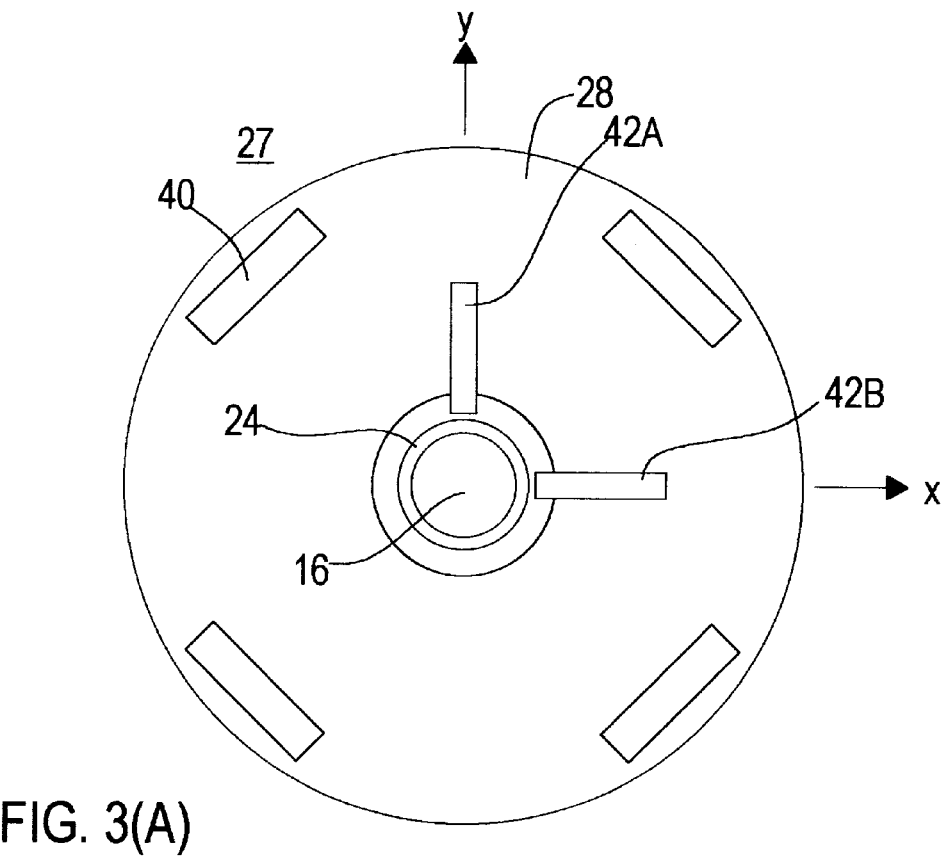
FIGS. 3(A) and 3(B) are used to depict position sensors used to sense x, y and z axes.
Figure 3B:
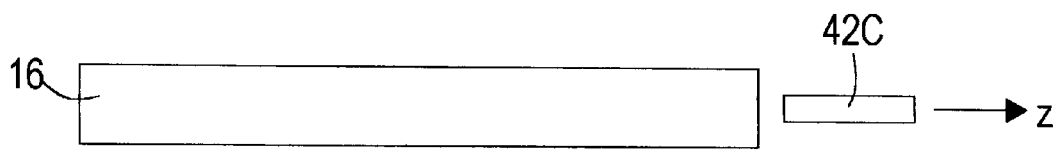

FIG. 3 is composed of FIG. 3(A) and FIG. 3(B), with FIG. 3(A) being a cross-section of the magnet-sensor disk 27 and FIG. 3(B) being a cross-section the shaft 16, wherein both FIGS. 3(A) and 3(B) are used to depict position sensors 42A, 42B and 42C used to sense x, y, and z axes. The position sensors 42A, 42B, and 42C, are respectively arranged in the x, y and z axes of the magnetic bearing 10, with position sensors 42A, 42B and 42C being orthogonal to each other. The sensors 42A, 42B, and 42C depicted in FIG. 3 are examples of position sensors. Various sensing schemes and configuration can be applied at these locations and other locations of the magnetic bearing 10. The split-poles 36, as well as the radial force coils 38, may be further described with reference to FIG. 4.

Figure 4:
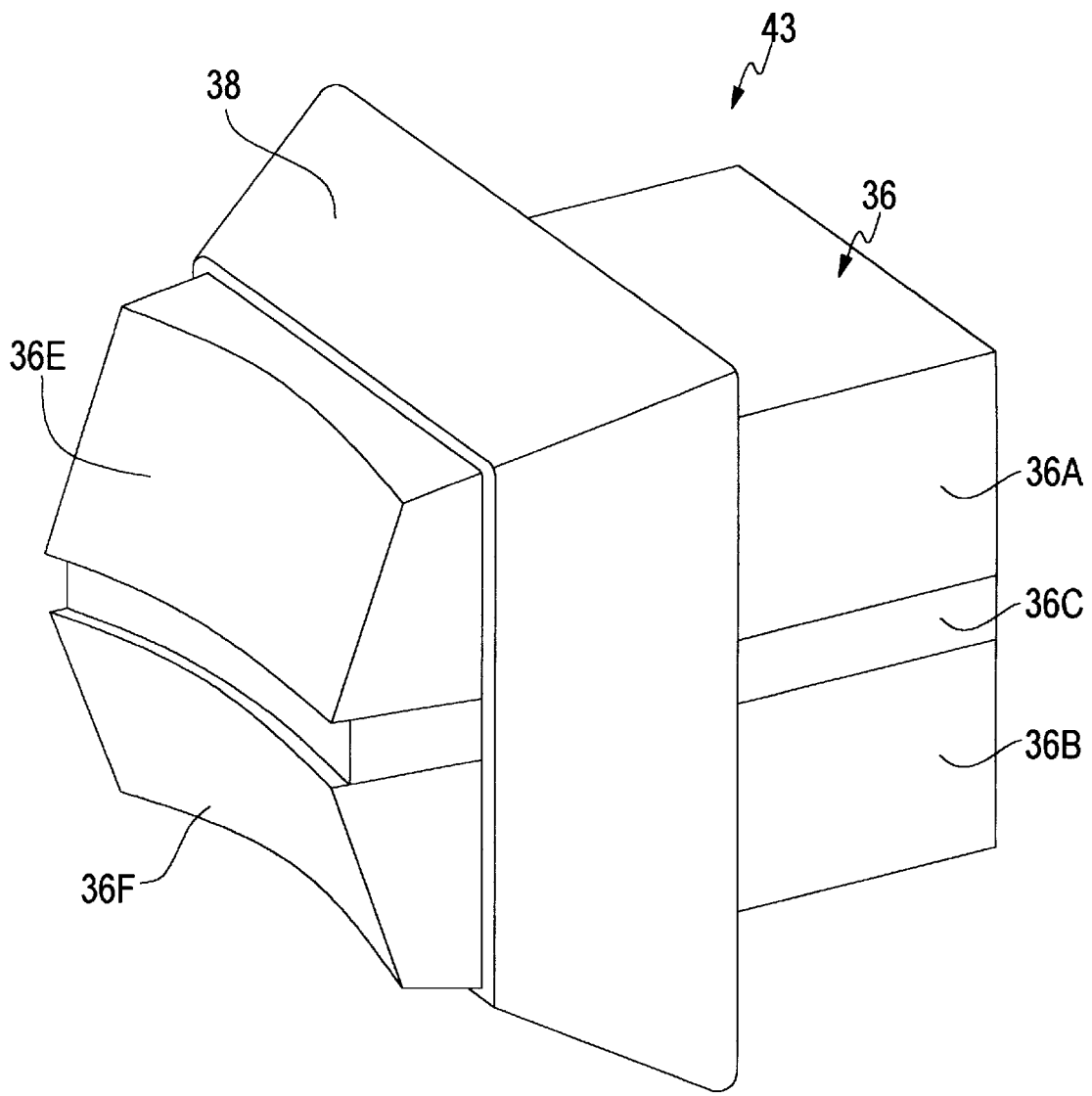
FIG. 4 is a perspective of a split-pole of the combination radial and thrust magnetic bearing of the present invention.

FIG. 4 illustrates the split-pole 36 and a radial force coil 38 as being arranged in a package 43 with the radial force coil 38 serving as an outer member for confining the split-pole 36 serving as an inner member. The split-pole 36 is essentially divided in halves 36A and 36B with a separation provided by a spacer 36C. The split-pole 36 has curved surface 36E and 36F, which are arranged within stator 14 to face the rotor pair 18A or 18B, with rotor elements 20A and 20B, or 20C and 20D, having complementary conical shapes.

The elements 30, 32, 36A, 36B, 20A, 20B, 20C, 20D and 16 are preferably comprised of a low reluctance material such as an iron alloy. Elements 36C and 28 are preferably comprised of a high reluctance material such as aluminum or fiberglass. It is preferable to use laminated material for elements 36A, 36B, 20A, 20B, 20C, and 20D to minimize rotational losses.

FIGS. 1, 5, 6, 7, and also 8, all to be further described hereinafter, are sectional views of the stator 14 and rotor 12, taken along the rotational axis of the rotor 12 to show at least first and second poles 36 of each stator element 26A and 26B operatively cooperating with both rotor pairs 18A and 18B. Each stator element 26A and 26B of FIGS. 5–8 is shown as having two symmetrical halves with upper and lower portions. More particularly, the stator 14 is shown as being divided into four quadrants 14A1, 14A2, 14B1 and 14B2. However, the cross-sections of FIGS. 5–8 do not show all the portions of the stator 14 of which there are preferably a minimum of eight (8), each portion being an octant of stator 14. This is more clearly shown by referring to FIG. 9.

Figure 8:
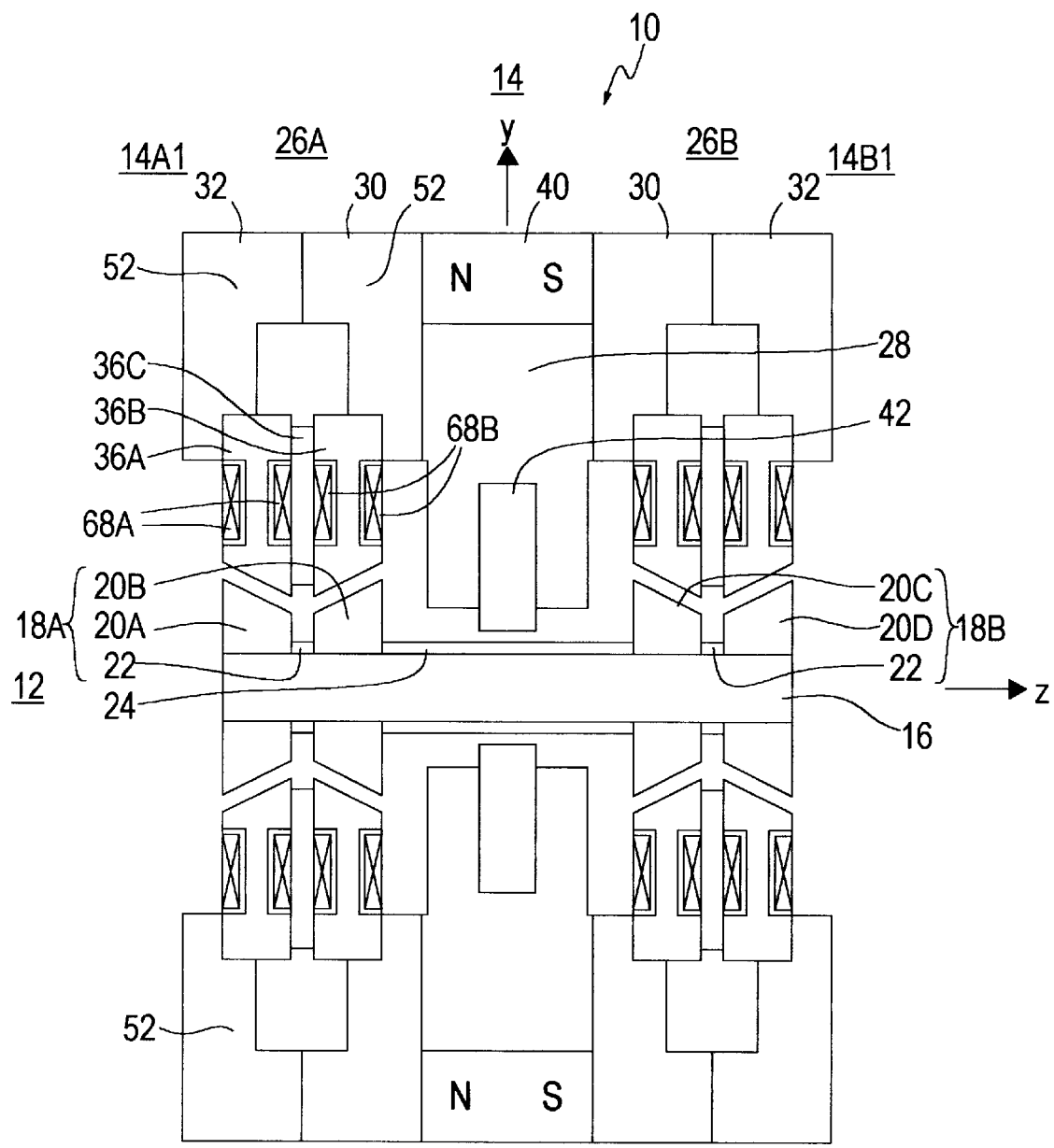
FIG. 8 is an alternate embodiment of a radial and thrust magnetic bearing of the present invention.
Figure 9:
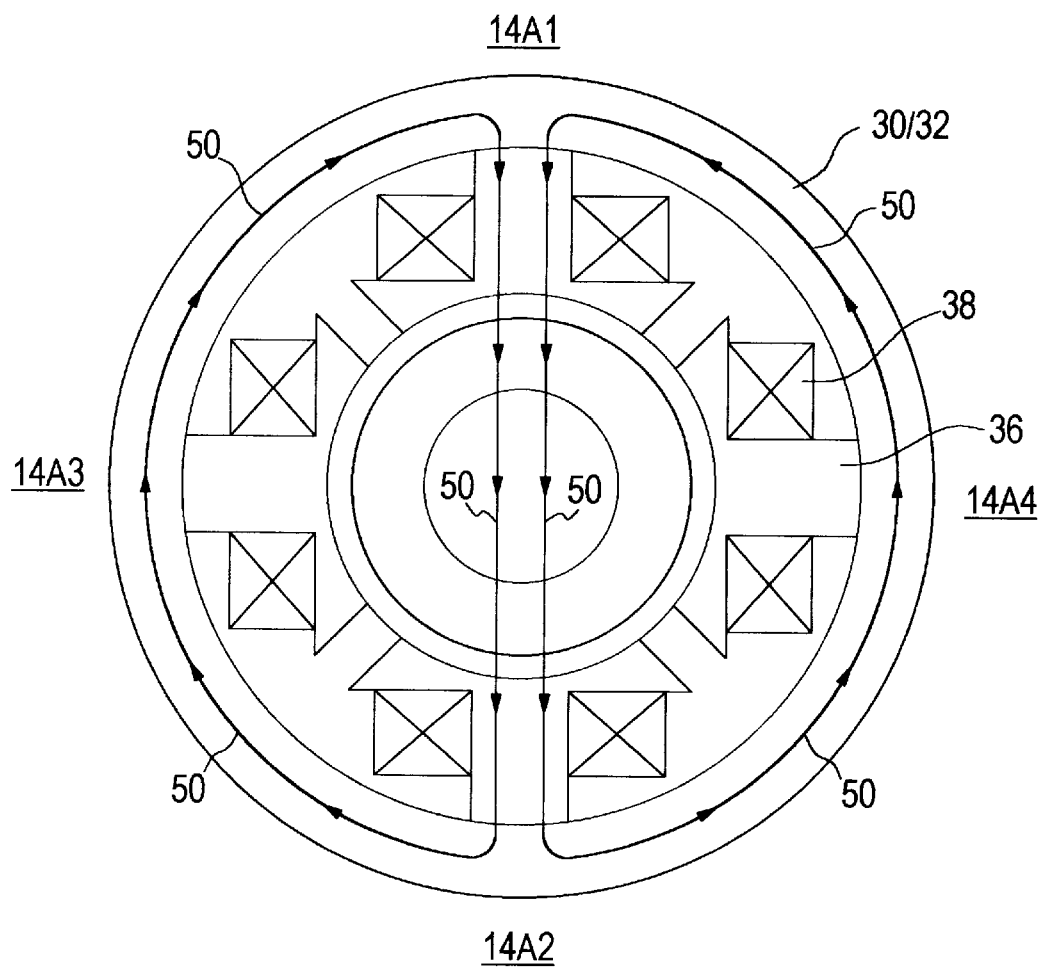
FIG. 9 is a schematic showing all eight octants associated with one embodiment of the radial and thrust magnet bearing of the present invention.

Looking at FIG. 9, stator element 26A is shown enclosed by outer flux ring 32 and divided into four quadrants, which results in a division of stator 14 into eight (8) parts which each containing a split-pole 36 and radial force coil 38. Octants 14A1 and 14A2 as shown in FIG. 9 were defined with reference to FIGS. 5–8. Octants 14A3 and 14A4 are shown in FIG. 9 to be orthogonal to 14A1 and 14A2. Likewise, stator element 26B will have corresponding octants 14B1 and 14B2, which were defined with reference to FIGS. 5–8, and octants 14B3 and 14B4.

The physics are such that to achieve levitation, at least two (2) radial force vectors are required, generally orthogonal to one another, denoted x and y axes with reference to FIGS. 3(A) and 5–8. The thrust axis is denoted the z axis as shown in FIG. 3(B).

In general, the combined radial and thrust magnetic bearing 10 of the present invention provides magnetic fields used to control the position of a shaft 16. The fixed part of the magnetic bearing is the stator 14. The positionally controlled portion of the magnetic bearing is the rotor 12. If magnetic bearings 10 are used in a mechanism that utilizes a motor to provide angular torque about the rotor 12 axis, the rotor 12 will be free to rotate about its axis. The stator 14 is comprised of stator element 26A, stator element 26B, and magnet-sensor disk 27. Magnet-sensor disk 27 comprises a disk element 28, bias magnets 40 and position sensors 42A and 42B. The rotor 12 comprises a shaft 16, a first rotor pair 18A and a second rotor pair 18B and sensor sleeve 24.

Each stator element 26A and 26B has an inner flux ring 30 respectively cooperating with, an outer flux ring 32, at least first, second, third, and fourth split poles 36, at least first, second, third, and fourth radial force coils 38, and thrust force coil 34. The at least first bias magnet 40 cooperates with stator element 26A and stator element 26B. Stator element 26A and stator element 26B respectively cooperate with first rotor pair 18A and second rotor pair 18B of rotor 12, each rotor pair 18A and 18B being separated from each other and connected to the shaft 16, which is of, and is to be controlled by, the combination radial and thrust magnetic bearing 10 of the present invention. Each of the at least first, second, third, and fourth split-poles 36 of each stator element 26A and 26B is aligned in correspondence with its respective rotor pair 18A and 18B and separated therefrom by an air gap 44 shown in FIGS. 5–7. Each of the at least first, second, third, and fourth radial force coils 38, of each stator element 26A and 26B, is respectively arranged about the at least first, second, third, and fourth split-poles 36. The thrust force coil 34, of each stator element 26A and 26B, has its axis coincident with the shaft 16 axis when it is centered, with its coil cross-section contained by inner flux ring 30, outer flux ring 32, and the at least first, second, third, and fourth split-poles 36. The at least first bias magnet 40 is arranged between the inner flux rings 30 of each stator element 26A and 26B. Inner flux ring 30, outer flux ring 32 and split-poles 36 together create low reluctance magnetic paths for magnetic fluxes resulting from the at least first bias magnet 40 and for magnetic fluxes resulting from energizing radial force coils 38 and thrust force coils 34. Likewise, rotor pairs 18A and 18B together with shaft 16 create low reluctance paths for the magnetic fluxes.

Figure 5:
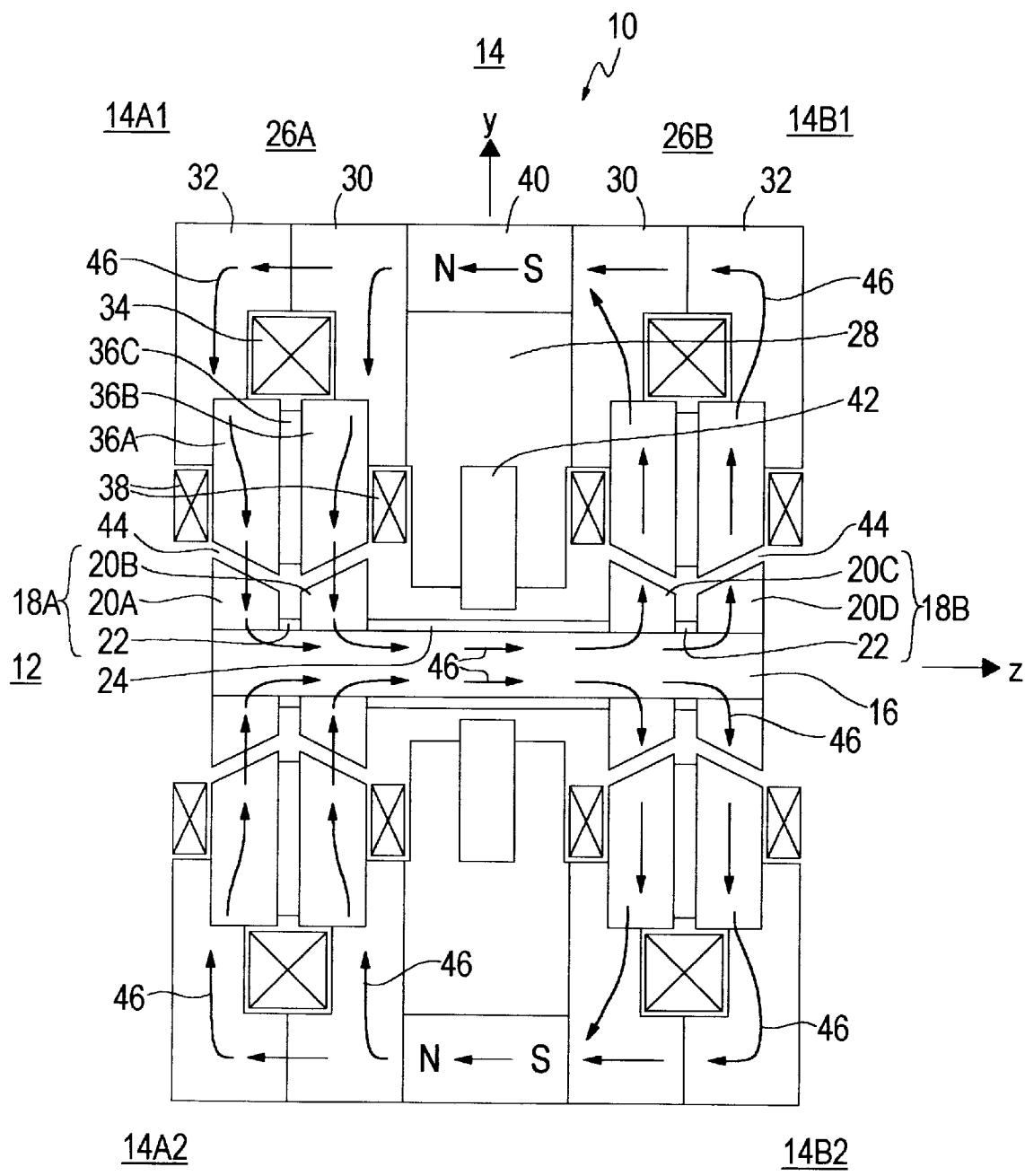
FIG. 5 is a schematic showing the flow of the bias flux associated with the combination radial and magnetic bearing of the present invention.

FIG. 5 illustrates the flow of bias magnetic flux by means of directional arrows 46. The inner flux rings 30, the outer flux rings 32, the split-poles 36, the rotor pairs 18A and 18B, the shaft 16, and the bias magnets 40, provide the paths for the flow of bias magnetic flux 46 as shown in FIG. 5. More particularly, as seen in FIG. 5, the bias flux 46 flows from the split-pole 36 in octant 14A1 associated with the first rotor pair 18A through the air-gap 44 thereat, along the shaft 16 to the second rotor pair 8B, through the air-gap 44 thereat, to the split-pole 36 in octant 14B1, through a portion of the outer flux ring 32, through portions of the inner flux ring 30, through the bias magnet 40 associated with both octants 14A1 and 14B1, with bias magnet 40 oriented so as to provide the direction of bias magnetic flux 46 as is described, through portions of the inner flux ring 30, through a portion of the outer flux ring 32, and back to the original split-pole 36 in octant 14A1. Similarly, the flow of bias flux 46 in the lower half, that is, octants 14A2 and 14B2 is symmetrical as that shown in the upper half, that is, octants 14A1 and 14B1. The flow of bias flux 46 in octants 14A3, 14A4, 14B3, and 14B4 is respectively identical to that of octants 14A1, 14A2, 14B1, and 14B2.

Figure 10:
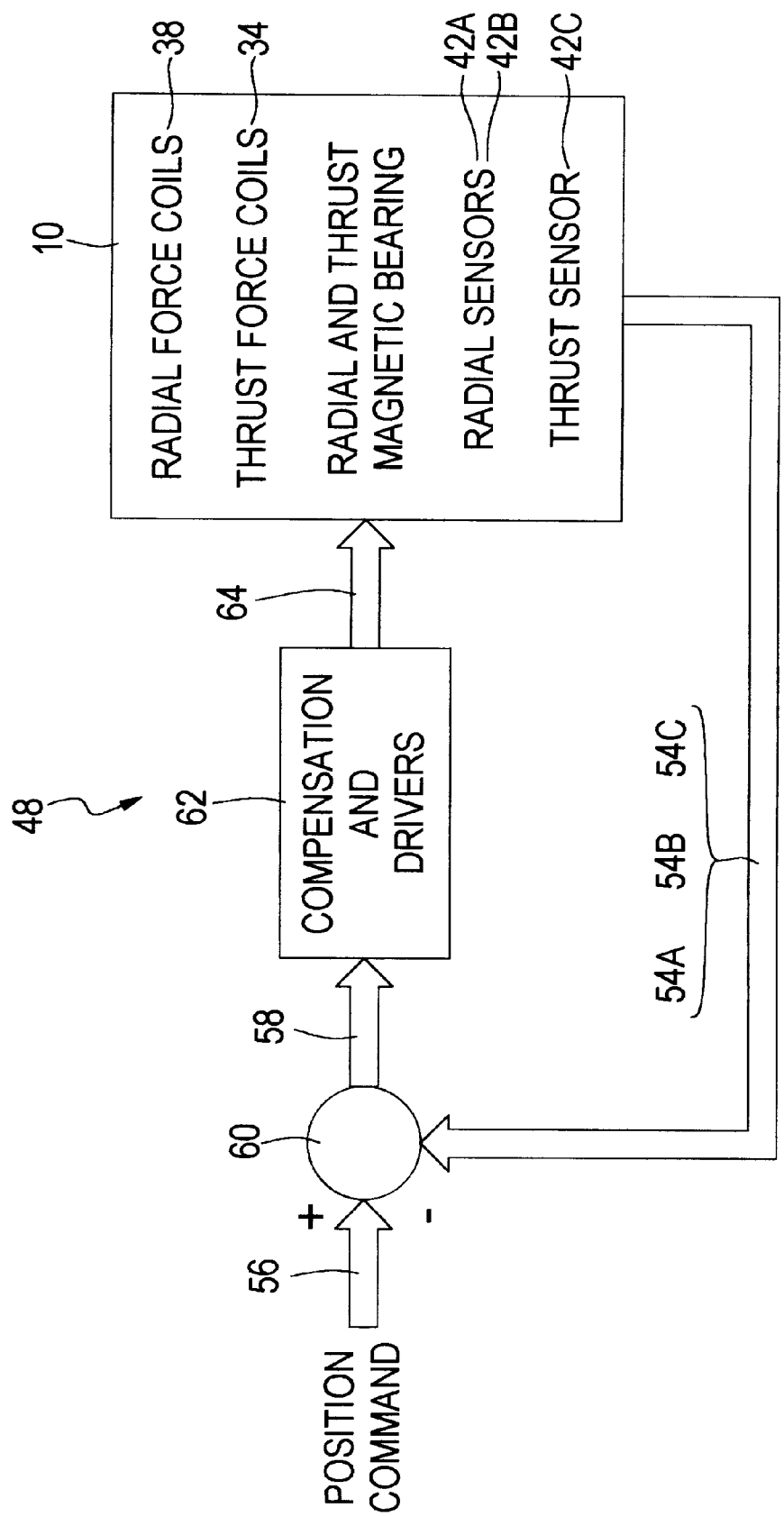
FIG. 10 is a block diagram of a feedback control system that may be utilized in the practice of the present invention.

With no coils energized, that is without any of the thrust force coils 34 or any radial force coils 38 energized, and assuming that the rotor 12 is centered such that air-gaps 44 are equal at locations with respect to all split-poles 36, the bias magnetic flux 46 distribution at air-gaps 44 will be essentially uniform and a balance of magnetic forces will act upon the rotor 12 so that it will theoretically remain centered if not disturbed. However, in practice, this naturally unstable system will always result with the shaft residing in a random extreme radial and thrust location so long as the system is not operational, that is when the feedback control system 48, to be further described hereinafter with reference to FIG. 10, is not energized. When operational, that is when the feedback control system 48 is energized, the operation of the combined radial and thrust magnetic bearing 10 of the present invention in response to the controlled energizing of the radial force coils 38, may cause movement of and/or force upon the shaft 16 in the radial direction. This may be further described with reference to FIG. 6, which is the same cross-section as FIG. 5, but depicting the flow of radial magnetic flux 50.

Figure 6:
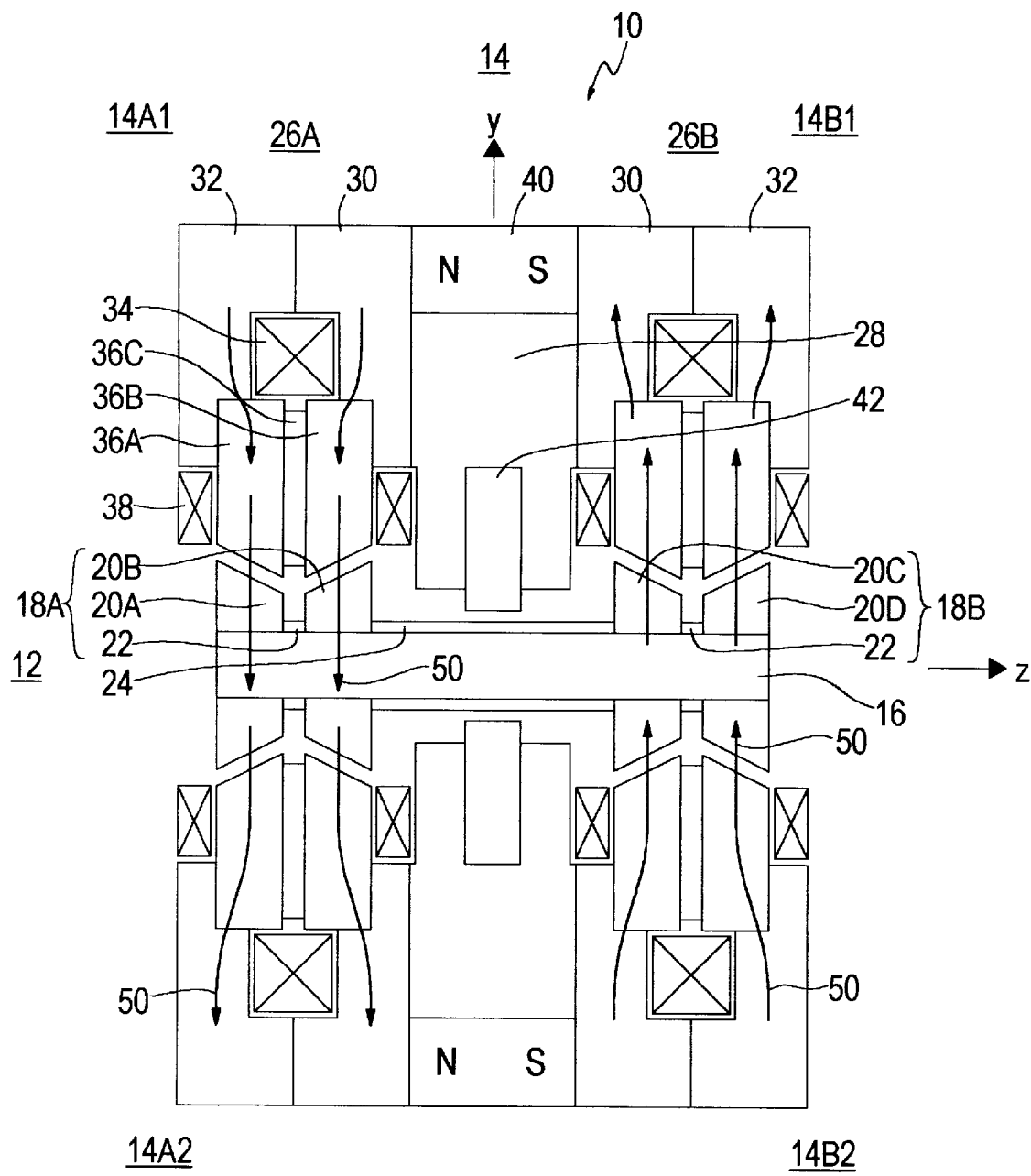
FIG. 6 is a schematic showing the flow of radial force flux of any radial axis of the combination radial and thrust magnetic bearing of the present invention.

Split-poles 36, as shown in FIG. 6, and corresponding rotor pairs 18A and 18B are conical in shape such that air-gaps 44 in the cross-sectional view of FIGS. 5 through 8 depict air-gaps 44 to be at some angle between 0 and plus/minus 90 degrees. The forces acting upon the rotor 12 act upon the rotor by force vectors normal to the surfaces of rotor elements 20A, 20B, 20C, and 20D. Since these force vectors exist at some angle between either the y and z direction, or at some angle between the x and z direction, appropriately varying the magnetic flux distribution around the rotor elements 20A, 20B, 20C, and 20D, by means of appropriately energizing radial force coils 38 and thrust coils 34, will result in the desired forces to act upon rotor 12 in the x, y, and z directions.

Energizing the radial force coils 38 in four octants 14A1, 14A2, 14B1, and 14B2, creates an imbalance of magnetic fluxes on different sides of the rotor pairs 18A and 18B such that a radial force in the y or –y direction is created. More particularly, as seen in FIG. 6, the radial force coils 38 are energized so as to cause the radial magnetic flux 50 to flow downward in octants 14A1 and 14A2, and upward in octants 14B2 and 14B1. The full path of the radial magnetic flux 50 in octants 14A1 and 14A2 is shown in stator element 26A of FIG. 9. This view of FIG. 9 is along the shaft 16 axis looking toward the outer flux ring 32. The return radial magnetic flux 50 is around the outer magnetic flux ring 32 as shown in FIG. 9 and in the same manner around inner magnetic flux ring 30, which is not visible in FIG. 9. Similarly, as seen in FIG. 6, the return radial magnetic flux 50 is around the outer magnetic flux ring 32 and inner magnetic flux ring 30 for stator element 26B. The radial magnetic fluxes 50 as just described, add to the bias magnetic fluxes 46 in the air-gaps 44 in octants 14A1 and 14B1, and subtract from the bias magnetic fluxes 46 in the air-gaps 44 in octants 14A2 and 14B2, thus causing a net force on the rotor 12 which would move the rotor 12 in the direction toward octants 14A1 and 14B1, in the y direction. Likewise, if the currents were reversed in the radial force coils 38, causing the radial magnetic flux 50 to be reversed from what is depicted in FIG. 6 and 9, and reversed from what has been described, the net force acting on the rotor 12 would move it in the direction away from octants 14A1 and 14B1, in the −y direction. Energizing the radial force coils 38 in octants 14A3, 14A4, 14B3, and 14B4 in like manner as the octants 14A1, 14A2, 14B1, and 14B2 as previously described, results in a net radial force acting on the rotor 12 that is orthogonal to the radial force that was previously described, in the x and −x directions. When energizing radial force coils 38, minimal thrust forces in the z direction occur due to the fact that the magnetic flux distributions of rotor pair 18A are symmetrical to the magnetic flux distributions of rotor pair 18B, so that the thrust forces acting on each rotor element 20A and 20B of rotor pair 18A is balanced by an opposing thrust force of each symmetrical element 20D and 20C, respectively of rotor pair 18B, the plane of symmetry being orthogonal to the shaft 16 axis passing through the shaft midpoint of sensor sleeve 24. In particular, referring to FIG. 6, thrust forces acting upon rotor element 20A will be of opposite polarity to thrust forces acting upon rotor element 20D, and thrust forces acting upon rotor element 20B will be of opposite polarity to thrust forces acting upon rotor element 20C, thus canceling the thrust forces.

When operational, that is when the feedback control system 48 is energized, the operation of the combined radial and thrust magnetic bearing 10 of the present invention in response to the controlled energizing of the thrust force coils 34, may cause movement of and/or force the upon shaft 16 in the thrust direction. This may be further described with reference to FIG. 7, which is the same cross-section as FIG. 5, but depicting the flow of thrust magnetic flux 52.

Figure 7:
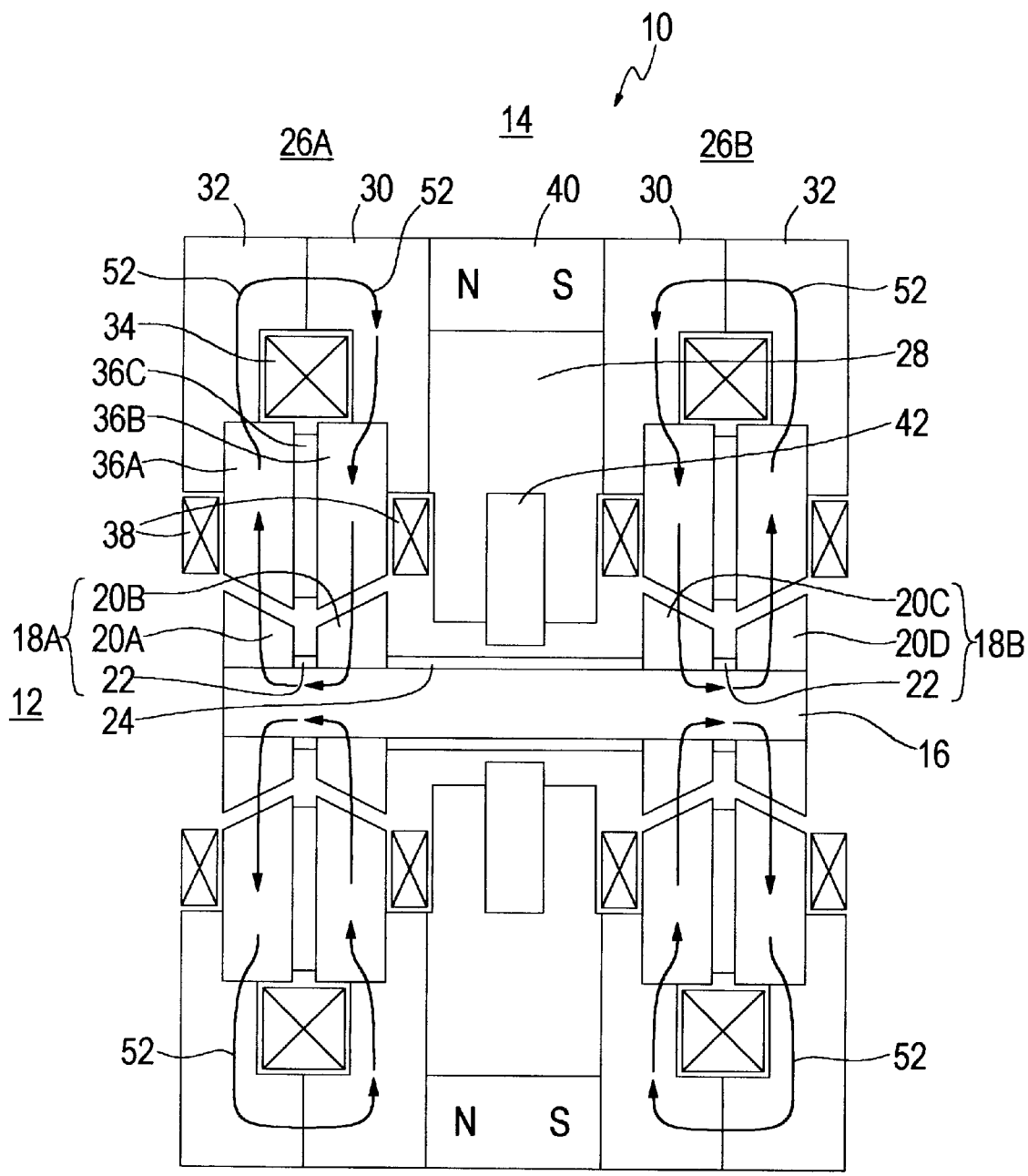
FIG. 7 is a schematic showing the thrust force flux associated with the combination radial and thrust magnetic bearing-of the present invention.

Energizing the thrust force coils 34 creates an imbalance of magnetic fluxes on different sides of the rotor pairs 18A and 18B such that a thrust force in the z or −z direction is created. More particularly, as seen in FIG. 7, the thrust force coils 34 are energized so as to cause the thrust magnetic flux 52 to flow radially outward of rotor elements 20A and 20D and radially inward of rotor elements 20B and 20C. The thrust magnetic fluxes 52 flow in and out of split-poles 36 in all eight octants 14A1, 14A2, 14A3, 14A4, 14B1, 14B2, 14B3, and 14B4. The thrust magnetic fluxes 52 as just described, add to the bias magnetic fluxes 46 in the air-gaps 44 associated with rotor elements 20B and 20D, and subtract from the bias magnetic fluxes 46 in the air-gaps 44 associated with rotor elements 20A and 20C, thus causing a net force on the rotor 12 which would move it in the −z direction. Likewise, if the currents were reversed in the thrust force coils 34, causing the thrust magnetic flux 52 to be reversed from what is depicted in FIG. 7, the net force acting on the rotor would move it in the z direction. When energizing thrust force coils 34, minimal radial forces occur due to the fact that magnetic fluxes are distributed uniformly around each of the rotor elements 20A, 20B, 20C, and 20D.

Radial and thrust force coils 38 and 34 can be simultaneously and independently used to provide force in both the radial and thrust axes, in both the plus and minus x, y, and z directions. As previously mentioned, a feedback control system 48 is desired for providing the appropriate actuation.

FIG. 10 illustrates the feedback control system 48, whose purpose is to control the position of shaft 16 with stability. Radial position sensors 42A and 42B, and thrust position sensor 42C, as seen in FIG. 3, respectively provide feedback signals 54A, 54B, and 54C which are subtracted from position command signals 56, resulting in error signals 58 out of summer 60 which are processed by the appropriate compensation and driver circuitry 62, known in the art, which provides the appropriate currents 64 to radial force coils 38 and thrust force coils 34.

A further embodiment 66 of the present invention is indicated in FIG. 8. For such an embodiment 66, each split-pole 36 has (2) coils, thrust force coils 34 and radial force coils 38 are eliminated. More particularly, split-pole half 36A, as discussed with reference to FIG. 4, has coil 68A serving as an outer member for confining the split-pole half 36A serving as an inner member. Likewise, split-pole half 36B has coil 68B serving as an outer member for confining the split-pole half 36B serving as an inner member. The separate coils can be energized appropriately to create all the various flux conditions previously described resulting in both radial and thrust activation to provide force and/or movement of the shaft 16.

It should now be appreciated that the present invention provides a single homopolar magnetic bearing of a compact design having improved performance especially created by a mechanism to control a rotating shaft along the radial and thrust directions of x, y, and z.

It should be further appreciated that the present invention provides a magnetic bearing having independent magnetic paths for radial and thrust control coils, such that the magnetic flux path does not flow through any bias magnets so that maximal coil efficiencies can be achieved. Moreover, the present invention provides a magnetic bearing using laminated material for carrying magnetic fluxes to develop both radial and thrust forces so as to minimize rotational losses.

Although there has been shown and described multiple preferred embodiments of the present invention, it should be understood that the present invention is still capable of change and modifications that are within the scope of this invention.

What I claim is:

1. A combination radial and thrust magnetic bearing providing magnetic fields used to control a shaft in both radial and thrust axes comprising:
   (a) a rotor comprising a shaft, a first rotor pair having conical rotor elements separated from each other by a first spacer, and a second rotor pair having rotor elements separated from each other by a second spacer, said first rotor pair being separated from said second rotor pair by a sensor sleeve; and
   (b) a stator having first and second stator elements separated from each other by a magnet-sensor disk, said magnet-sensor disk having means to locate bias magnets and means to secure a plurality of position sensors, each of said first and second stator elements comprising:
      (i) an inner flux ring;
      (ii) an outer flux ring;
      (iii) a thrust coil;
      (iv) a plurality of split-poles with conically symmetric pole faces; and
      (v) a plurality of radial force coils, one for each of said plurality of split-poles and operatively connected thereto.

2. The magnetic bearing according to claim 1, wherein said split-poles and said radial force coils are respectively arranged in a package with the radial force coil serving as an outer member for confining the split-pole serving as an inner member.

3. The magnetic bearing according to claim 2, wherein said packages comprise a plurality numbering eight (8) or any multiple of eight (8).

4. The magnetic bearing according to claim 1, wherein said bias magnets comprise a number of one (1) or more.

5. The magnetic bearing according to claim 1, wherein said thrust force coils comprise a number of two (2).

6. The magnetic bearing according to claim 1, wherein said radial force coils and said thrust force coils have means to be activated.

7. The magnetic bearing according to claim 1, wherein said conical rotor elements are tapered.

8. A combination radial and thrust magnetic bearing providing magnetic fields used to control a shaft in both radial and thrust axes comprising:
  (a) a rotor comprising a shaft, a first rotor pair having conical rotor elements separated from each other by a first spacer, and a second rotor pair having rotor elements separated from each other by a second spacer, said first rotor pair being separated from said second rotor pair by a sensor sleeve; and
  (b) a stator having first and second stator elements separated from each other by a magnet-sensor disk, said magnet-sensor disk having means to locate bias magnets and means to secure a plurality of position sensors, each of said first and second stator elements comprising:
    (i) an inner flux ring;
    (ii) an outer flux ring; and
    (iii) a plurality of split-poles with conically symmetric pole faces and with each split-pole having split-pole halves with a coil arranged therearound.

9. A method for providing magnetic fields used to control a shaft in both radial and thrust axes, said method comprising the steps of:
  (a) providing a rotor comprising a shaft, a first rotor pair having conical rotor elements separated from each other by a first spacer, and a second rotor pair having conical rotor elements separated from each other by a second spacer, said first rotor pair being separated from said second rotor pair by a sensor sleeve; and
  (b) providing a stator having first and second stator elements separated from each other by a magnet-sensor disk, said magnet-sensor disk having means for locating bias magnets and means for securing a plurality of position sensors, each of said first and second stator elements comprising:
    (i) an inner flux ring;
    (ii) an outer flux ring;
    (iii) a thrust coil;
    (iv) a plurality of split-poles with conically symmetric pole faces; and
    (v) a plurality of radial force coils one for each of said plurality of split-poles and operatively connected thereto.

10. The method according to claim 9, wherein said split-poles and said radial force coils are respectively arranged in a package, with the radial force coils serving as an outer member for confining the split-pole pieces serving as an inner member.

11. The method according to claim 10, wherein said packages comprises a number eight (8) or any multiple of eight (8).

12. The method according to claim 9, wherein said bias magnets comprise a number of one (1) or more.

13. The method according to claim 9, wherein said radial force coils and said thrust force coils are selectively activated.

14. The magnetic bearing according to claim 9, wherein said conical rotor elements are tapered.

15. A method for providing magnetic fields used to control a shaft in both radial and thrust axes, said method comprising the steps of:
  (a) providing a rotor comprising a shaft, a first rotor pair having conical rotor elements separated from each other by a first spacer, and a second rotor pair having conical rotor elements separated from each other by a second spacer, said first rotor pair being separated from said second rotor pair by a sensor sleeve; and
  (b) providing a stator having first and second stator elements separated from each other by a magnet sensor disk, said magnet sensor disk having means for locating bias magnets and means for securing a plurality of position sensors, each of said first and second stator elements comprising:
    (i) an inner flux ring;
    (ii) an outer flux ring; and
    (iii) a plurality of split-poles with conically symmetric pole faces and with each split-pole having split-pole halves with a coil arranged therearound.

16. The method according to claim 15, wherein said bias magnets comprise a number of one (1) or more.

17. The magnetic bearing according to claim 15, wherein said conical rotor elements are tapered.

* * * * *